June 5, 1945. H. E. MERRITT 2,377,354
STEERING MECHANISM FOR TRACK-LAYING VEHICLES
Filed Dec. 19, 1940 2 Sheets-Sheet 1

Inventor
Henry Edward Merritt
By: Eugene E. Stevens
ATTY.

June 5, 1945. H. E. MERRITT 2,377,354
STEERING MECHANISM FOR TRACK-LAYING VEHICLES
Filed Dec. 19, 1940 2 Sheets-Sheet 2
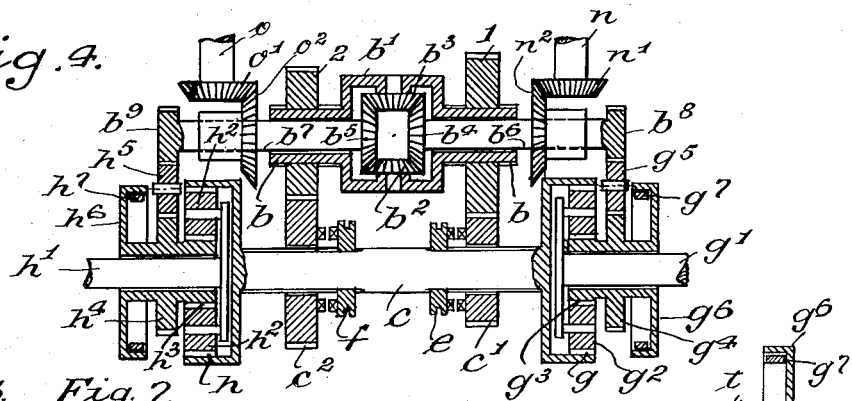
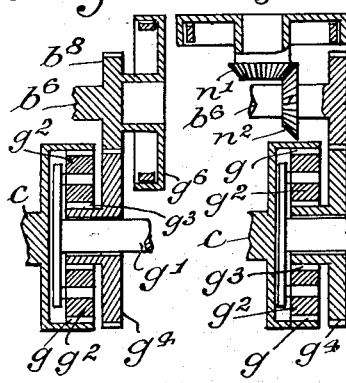
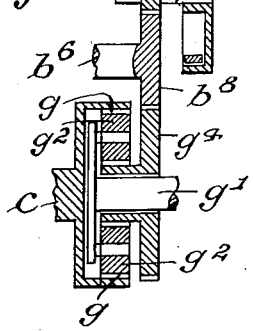
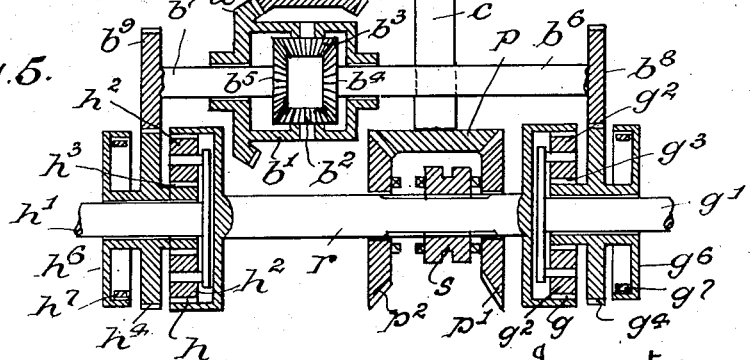
Inventor
Henry Edward Merritt
By: Eugene E. Stevens
ATTY.

Patented June 5, 1945

2,377,354

UNITED STATES PATENT OFFICE 2,377,354

STEERING MECHANISM FOR TRACK-LAYING VEHICLES

Henry Edward Merritt, Huddersfield, England

Application December 19, 1940, Serial No. 370,877
In Great Britain December 20, 1939

13 Claims. (Cl. 180—9.2)

This invention relates to steering mechanisms for track-laying vehicles and has for its object to provide an improved construction whereby the difference between the speeds of the tracks necessary to produce a change in the direction of motion or orientation of the vehicle may be obtained by simple mechanism with minimum loss of power, together with the further advantages of ease of control, a favourable relationship between the speed of the vehicle and its turning radius, and the ability to cause the vehicle to pivot about its centre when stationary.

When the direction of motion or orientation of a track-laying vehicle is changed, that portion of a track in contact with the ground at any instant moves relative thereto about an instantaneous centre, the position of which depends upon the combined forces applied to the tracks by the driving mechanism. In order to maintain angular motion of a track relative to the ground it is necessary to apply to it a couple about a vertical axis (the magnitude of this couple being diminished if a longitudinal force is also applied) and since the couples required to skid both tracks must act in the same sense it is necessary to apply a couple to the vehicle as a whole. This couple, in the absence of auxiliary means for turning the vehicle, can be derived only from an algebraic difference between the tractive efforts exerted by the respective tracks.

In the simplest and probably best-known method of steering a track-laying vehicle, namely, the "clutch-and-brake" system, the necessary couple is obtained by disconnecting the drive from one track, and, if the algebraic difference of tractive effort is insufficient to cause the vehicle to turn, a brake is applied to that track in order to produce a negative tractive effort. This system enables a vehicle to execute a "skid turn," i. e., a turn during which one track is locked, without loss of power in the steering brake, but if the vehicle be travelling at any considerable speed, then either the brake must be applied with such force as will cause the track to skid longitudinally, resulting in undue deceleration and an excessive and uncontrollable rate of turn, or the brakes must be allowed to slip and waste power at a rate which usually exceeds that at which it can be developed by the engine.

An even less efficient system is that of the simple differential, in which the drive to the tracks is divided by a differential gear and a brake is applied to that track which it may be desired to retard or arrest. In this case one-half of the total tractive effort must be destroyed by the brake before a negative tractive effort can be induced. As in the clutch-and-brake system, the only turning circle which is positively controlled is that which results when one track is brought to rest by the brake, and this turning circle can safely be used only at relatively low speeds.

In known "controlled differential" systems, use is made of symmetrical epicyclic trains so arranged in combination with a differential gear that by the application of either of two steering brakes the pinions of the differential gear are caused to rotate and thereby increase the speed of one track by the same amount that the speed of the other is reduced. In such known mechanisms the ratio of the speeds of the respective tracks is constant when slip of the brake ceases. The effect of such arrangements is to reduce the loss of power in the brakes but to produce a substantially constant minimum radius of turning circle effective when slip of the brake ceases. A somewhat similar effect is obtained from what may be termed "geared steering" mechanisms in which two independent two-speed gears are incorporated between the output from the change-speed gear and the input drive to the tracks, with the difference in behaviour that when the lower gear on one side is engaged in order to execute a turn, the mean speed of the vehicle is also reduced.

The feature of a constant turning circle radius is open to the objection that a given turning circle radius must, in the case of vehicles of relatively high speed, either be too small for efficiency or controllability at high speed or too large for manoeuvrability in confined spaces, and auxiliary clutch-and-brake steering is sometimes adopted.

According to the present invention, a differential mechanism and two epicyclic trains are combined with, or employed in conjunction with, change-speed mechanism in such a way that the speed of the differential mechanism is equal or proportionate to the speed of the input shaft of the change-speed mechanism, the two epicyclic trains being interposed between the output shaft of the change-speed mechanism and the drive to the corresponding track or road wheel, and one member of each epicyclic train being connected by gearing to the differential mechanism. Means are provided whereby relative motion of the gears forming the differential mechanism can be induced, a difference between the speeds of the tracks or road wheels being thereby produced which is proportional to, or a function of, the speed of the input shaft of the change gear.

In the accompanying drawings,

Fig. 2 shows a construction generally similar to that shown in Fig. 1, but differing therefrom in that the use of intermediate gears between the sun wheels of the epicyclic trains and the half-shafts of the differential mechanism are dispensed with.

Fig. 4 shows an arrangement in which a separate drive is provided for each half-shaft of the differential mechanism instead of both half-shafts receiving drive from a common drive shaft as in the constructional forms shown in Figs. 1, 2 and 3;

Fig. 5 shows an alternative lay-out or arrangement of mechanism which may be adopted; and Figs. 6, 7 and 8 show various alternative permissible arrangements of steering brakes.

Figure 1:
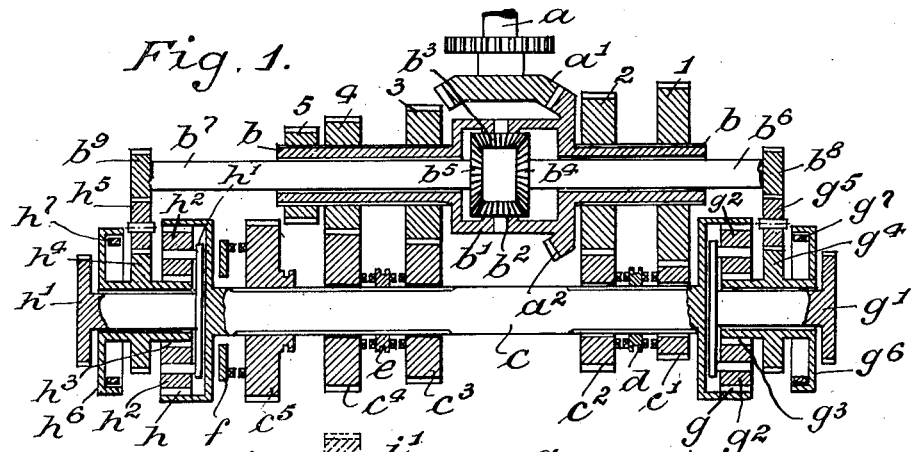
Fig. 1 shows, in sectional elevation, what is probably the simplest form of construction of mechanism according to the invention.

Referring firstly to Fig. 1, $a$ represents a driven input shaft connected by bevel gears $a'$ and $a^2$ to the primary shaft $b$ of a change-speed mechanism comprising a series of gears $1-5$, splined on the shaft $b$, the gears $1-4$ meshing constantly with respective gears $c'—c$ mounted loosely upon a secondary shaft $c$, whilst the gear $5$ on the primary shaft $b$ is capable of being engaged by a gear $c^5$ slidably splined on the secondary shaft. Either of the gears $c'$ or $c^2$ on the secondary shaft is capable of being engaged by a clutch member $d$ slidably splined on the shaft and either of the gears $c^3$ or $c^4$ is capable of being engaged by a clutch member $e$ slidably splined on the shaft. The sliding gear $c^5$ is capable of being moved into engagement with a fixed locking member $f$, to cause thereby the secondary shaft $c$ to be locked against rotation.

The primary shaft $b$ is shown as being in the form of a sleeve and as carrying an enlargement or casing $b'$ in which are journalled the planet bevels $b^2$ and $b^3$ of a differential mechanism, the sun wheels $b^4$ and $b^5$ of which are mounted on respective half-shafts $b^6$ and $b^7$ which extend out, as shown, in opposite directions through the hollow primary shaft.

The secondary shaft $c$ carries at each end the annulus $g$ or $h$ of an epicyclic gear train of sun-and-planet type. The member $g'$ or $h'$ which carries the planet pinions $g^2$ or $h^2$ is adapted to transmit final drive to the sprocket of the respective track through further reduction gearing, if necessary, and the sun gear $g^3$ or $h^3$ of each epicyclic train is meshed, through a gear $g^4$ or $h^4$ fast upon it, and through an intermediate gear $g^5$ or $h^5$, with a gear $b^8$ or $b^9$ on the respective half-shaft $b^6$ or $b^7$. Also connected with each sun gear $g^3$ or $h^3$ is a brake drum $g^6$ or $h^6$ acted upon by a suitably-controlled brake shoe $g^7$ or $h^7$. By means of these brakes the respective sun-gears and half-shafts may be retarded or brought to rest.

In the arrangement according to Fig. 1, the speed given to the output members $g'$ or $h'$ when the differential mechanism rotates en bloc is the sum of two components respectively proportional to the speeds of the primary and secondary shafts $b$ and $c$. Further, by reason of the intermediate gears $g^5$ and $h^5$ provided in the half-shaft-sun-gear trains, the component to the primary shaft $b$ has a negative sign, that is to say it acts in the backward direction.

If now one of the steering brakes $g^7$ or $h^7$ is applied and the corresponding sun-gear $g^3$ or $h^3$ is brought to rest while the primary shaft $b$ continues to rotate, the negative component of the speed of the output member on that side of the vehicle is eliminated and the speed of the said output member is correspondingly increased. Simultaneously, through the action of the differential mechanism the speed of the opposite half-shaft $b^6$ or $b^7$ is doubled and in consequence the negative component applied by the opposite unbraked sun-gear to the other epicyclic train is also doubled with the result that the speed of the corresponding track is diminished by the same amount by which the speed of the other is increased.

If one of the steering brakes be applied with a force insufficient to bring the associated half-shaft $b^6$ or $b^7$ to rest, equal and opposite torques are superimposed on the output members in addition to the torque exerted by the secondary shaft $c$. By suitably proportioning the ratios of the gear trains and the capacity of the brakes, the superimposed torques may be arranged to be sufficiently high to produce a negative resultant torque on one of the output members, a condition which is usually necessary in order to maintain angular skidding of the tracks. When the change-speed mechanism is in neutral, only the superimposed torques come into play and, since these are equal and opposite, the tracks tend to skid forward and backward respectively and thus cause the vehicle when standing on level ground, to pivot about a vertical axis through its centre of gravity. The circulation of power which takes place, when steering demands a negative tractive effort on one of the tracks, passes mainly through the secondary shaft $c$ and to a less extent through the steering train comprising the epicyclic trains and the differential mechanism.

It will be seen that relative motion of the parts of the differential mechanism is obtained by the application of one or other of the brakes $g^6$ or $h^6$. If one side of the differential mechanism is brought to rest, the difference in speed of the two tracks is directly proportional to the speed of the differential casing $b'$ and likewise to the speed of the input shaft $a$. The mean speed of the tracks or road wheels is, however, a function of the speed of the output shaft $b$ of the change-speed mechanism and the ratio of the speeds of the tracks increases with the ratio of reduction selected in the change-speed mechanism. The radius of the turning-circle described by the vehicle decreases as the ratio of the speeds of the tracks increases and consequently the turning-circle radius is greatest in high gear and least in low gear. Expressed in another way, the angular rate of turn of the vehicle is constant in all gears for the same speed of the input shaft $a$. This steering characteristic has the advantage that by suitably proportioning the gear ratios in the change-speed mechanism, the horsepower required to steer the vehicle in all gears can be kept well within the power developed by the engine, thus leaving an ample margin for forward propulsion. At the same time the turning-circle radius in high gear may be given a value which will lie within the limit imposed by the action of centrifugal force on the vehicle at maximum speed, whilst in the lower gears the respective turning-circle radii are reduced to values which permit adequate manoeuvrability in confined spaces in which the lower gears would be employed. When neutral gear is engaged and the vehicle is at a standstill, it may be made to pivot about its midpoint.

In all systems of steering which involve the application of brakes, the speed ratio of the tracks or road wheels is kinematically determinate only when the braked member has been brought to rest. The turning-circle-radius is then a minimum under the conditions prevailing, and the forces in the mechanism are determined by the path of the vehicle. If slip occurs at the brake, however, the forces in the mechanism are determined by two torques applied by the brake and the driving motor respectively and the path of the vehicle is determined by the tractive forces induced at the tracks or road wheels. Under the first-named conditions (kinematically determinate) the steering characteristics of the known steering systems hereinbefore referred to may be expressed algebraically as follows:

Let $N_1$ and $N_2$ represent the speeds of the sprockets which drive the tracks, or of the road wheels, described as outer and inner respectively in relation to the curved path of the vehicle when steering. For the clutch-and-brake and simple differential systems $$\frac{N_1}{N_2} = \infty$$

For controlled-differential systems, $$\frac{N_1}{N_2} = \frac{1+K}{1-K}$$

For geared steering systems, $$\frac{N_1}{N_2} = \frac{1}{1-K}$$

Whilst for the construction according to the invention in its simplest form as described above, $$\frac{N_1}{N_2} = \frac{1+Kr}{1-Kr}$$

when $k$ is a constant determined by the gear ratios and in the last case $r$ is the ratio between the speeds of the input and output shafts of the mechanism in any selected gear.

It is not essential that the speed component due to the primary shaft $b$ be negative, but it is advantageous to make it so. By so doing, the overall gear interval ratio, that is to say the ratio between the highest and lowest speed ratios between the input shaft of the gearbox and the output shaft of the epicyclic train is greater than the corresponding gear interval ratio between the primary and secondary shafts of the change speed mechanism, the change-speed gear interval ratio being limited by considerations of the robustness of the pinions and shafts. Moreover, the use of a negative primary-shaft component makes it possible, merely by preventing the secondary shaft $c$ from rotating, to obtain a reverse speed and the necessity for a special reverse-gear train is thereby obviated.

The product of torque and speed for which the steering brakes must be suitable in any given case is small in comparison with the other steering systems to which reference has been made, and the brakes may consequently be made smaller and lighter whilst retaining an adequate margin of durability. By suitable connection of whatever means may be employed for operating the steering brakes so that they may be brought into action simultaneously at will, they will together exert no resultant steering action but will produce a substantial braking action on the primary shaft of the change-speed mechanism, and this property may be utilised to simplify or accelerate the operation of changing gear.

It will be understood that the particular embodiment of the invention so far described represents only one form of construction which may be adopted, and in addition to the variations which may be devised in regard to the relative position of the change-speed mechanism, differential mechanism, brakes and epicyclic trains, the same basic mechanism may be employed in conjunction with various types of driving motor and steering brake.

Some of the constructional variations which may be adopted will now be described.

Firstly it may be remarked that the steering brakes need not necessarily be mounted on or associated with the sun gears $g^3$ and $h^3$ as shown in Fig. 1. They may, as will be obvious, be equally well connected to or associated with either the intermediate gears $g^5$ and $h^5$ or with the half shafts $b^6$ and $b^7$ of the differential mechanism.

Figure 2:
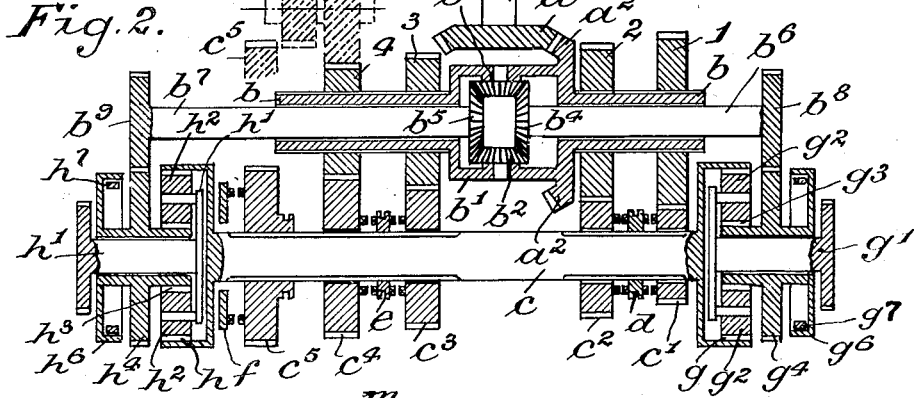

As shown in Fig. 2, the use of the intermediate gears between the sun gears $g^3$ and $h^3$ of the epicyclic trains and the half-shafts $b^6$ and $b^7$ of the differential mechanism may be dispensed with. The result is that the component due to the primary shaft is positive instead of being negative as in the arrangement according to Fig. 1. First speed is obtained as reverse was before by sliding the gear $c^5$ into engagement with the fixed locking member $f$ to lock the secondary shaft $c$ and reverse gear is obtained by sliding the gears $c^6$ into mesh with a reverse idler gear $i$, a gear $i'$ associated with which is in constant mesh with the gear 4 on the primary shaft $b$, the gear 5 shown in Fig. 1 being dispensed with. This arrangement gives a large overall gear interval ratio in forward speeds since the first speed ratio depends only upon the ratio of the final epicyclic trains and is independent of gear connections between the primary shaft $b$ and the secondary shaft $c$ of the change-speed mechanism.

Figure 3:
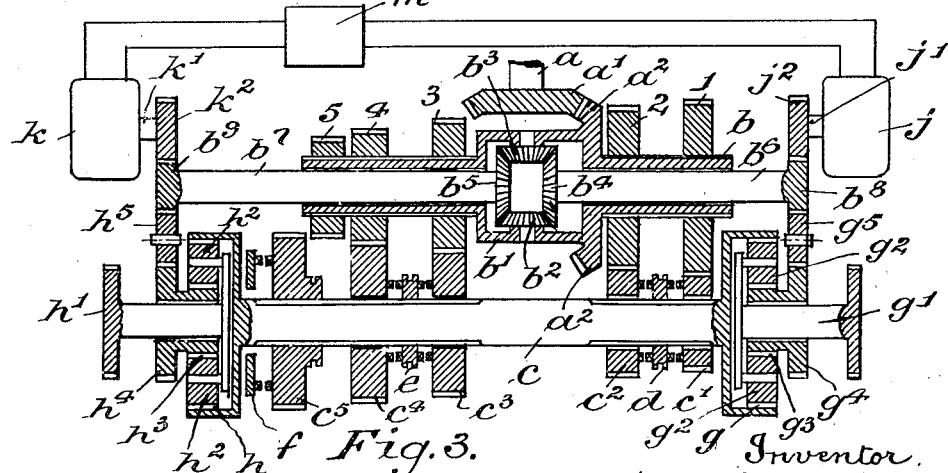
Fig. 3 shows a construction in which the friction brakes employed in the construction shown in Figs. 1 and 2 are replaced by motor generator units which may either develop or receive power.

In Fig. 3, I show an example of how variations may be made in the type of brake employed or in mechanism producing equivalent results. In this figure the friction brakes shown in Figs. 1 and 2 are replaced by motor-generator units $j$ and $k$ which may be of electric or hydraulic type, and are adapted either to develop or to receive power. The shafts $j'$ and $k'$ of the motor generator units carry gears $j^2$ and $k^2$ which mesh with the gears $b^8$ and $b^9$ on the respective differential half-shafts $b^6$ and $b^7$. When not steering, the units $j$ and $k$ revolve idly. In order to steer, control means $m$ adapted to control the units are operated to cause one unit to deliver power extracted from one of the differential half-shafts. This power is transferred through the other unit and the other differential half-shaft is driven. The speed of the differential half-shaft which supplies power is reduced by the proceeding described and that of the other, that is to say the driven, half-shaft is increased; thus producing a difference in speed between the output members.

In Fig. 4 an arrangement is shown in which, by means of bevel gears $n'$, $n^2$, and $o'$, $o^2$, the differential half-shafts are driven from respective shafts $n$ and $o$ receiving power from any suitable external source such as from separate internal combustion engines, in which case the number of gears in the change-speed mechanism will be the same as for a single-engine drive such as is shown in Figs. 1 and 2. If two electric motors are used to drive the shafts $n$ and $o$ the number of gears in the change-speed mechanism may be reduced.

If the differential half-shafts are separately or independently driven as indicated in Figs. 3 and 4 a steering characteristic is obtainable different from that obtained by the arrangements shown in Figs. 1 and 2, since by varying the ratio of the torque developed by the motors a difference of torque at the output members, proportional to the difference between the motor torques, is superimposed on the torques due to the secondary shaft $c$, the sum of which is proportional to the sum of the motor torques and to the ratio of reduction of the change-speed mechanism.

In the arrangement shown in Fig. 5, the primary shaft $a$ of the change-speed mechanism is adapted to receive directly the input power and the secondary shaft $c$, instead of carrying the annuli $g$ and $h$ of the epicyclic gear trains, carries a bevel gear $p$ which meshes with two bevel gears $p'$ and $p^2$ mounted loosely on a shaft $r$ carrying the annuli. A clutch member $s$, slidably splined on the shaft $r$, enables either of the gears $p'$ or $p^2$ to be connected to the shaft, to give either a forward or a reverse drive to the output shafts $g'$ and $h'$, the gears $5$ and $c^5$ in the earlier described arrangements being dispensed with.

Instead of the steering brakes being mounted on or associated with the sun gears $g^3$ and $h^3$ as shown in Figs. 1, 3, 4 and 5, they may be associated with the gears $b^8$ and $b^9$ as shown in Fig. 6, or with the bevels $n'$ and $n^2$ as shown in Fig. 7 or with pinions such as $t$, Fig. 8, meshing with the gears on the differential half-shafts.

The modifications or variations herein described represent merely alternative uses to which the basic mechanism constituting the invention may be put, and I wish it to be understood that I do not limit myself to the particular embodiments shown and described but may employ any other constructions equivalent thereto or designed to produce the same results.

Having thus described my invention, what I claim as new and desire to secure by Letters Patent is:

1. The combination with a change-speed mechanism including primary and secondary change-speed shafts, means for driving the primary shaft and change speed means for driving the secondary shaft from the primary shaft; of a differential gear including a casing, said differential gear casing driven by said primary shaft, a pair of planet pinions and a pair of sun gears incorporated in said differential gear casing, a separate half shaft carried by each of said sun gears, said sun gears meshing with said planet pinions, two similar epicyclic output shaft-incorporating trains having corresponding members connected to said secondary shaft to be driven thereby, means gearing said respective trains to different ones of said differential half shafts whereby the speeds given to the respective output shafts of said epicyclic trains are the resultants of the speeds of the corresponding differential half shafts and of the change speed secondary shaft, and means for inducing a difference of speed between said differential half shafts.

2. Steering mechanism according to claim 1 further characterized in that said gearing means comprise a train of gears between the differential half shafts and the corresponding member of the epicyclic train, said train of gears being so arranged that the component of the speed of the output shaft due to the speed of the differential half shaft is in the opposite direction to that due to the secondary change speed shaft, and wherein said means for inducing a difference of speed between the differential half shafts comprises brakes operative to control the respective speeds of the said half shafts.

3. The structure of claim 1 further characterized in that said gearing means comprise a train of gears between the differential half-shafts and the corresponding member of the epicyclic train, said train of gears being so arranged that the component of the speed of the output shaft due to the speed of the differential half shaft is in the opposite direction to that due to the secondary change-speed shaft.

4. Steering mechanism according to claim 1 further characterised in that the component of the speed of the output shaft due to the speed of the differential shaft acts in the same direction as that due to the secondary change speed shaft.

5. Steering mechanism according to claim 1 wherein the means for inducing a difference of speed between the differential half-shafts comprise brakes operative to control the respective speeds of the said half-shafts.

6. Steering mechanism according to claim 1, further characterised in that the component of the speed of the output shaft due to the speed of the differential shaft acts in the same direction as that due to the secondary change speed shaft, said means for inducing a difference of speed between the differential half-shafts comprising brakes operative to control the respective speeds of the said half-shafts.

7. Steering mechanism according to claim 1, motor generator units interconnecting said differential half shafts whereby power may be extracted from either differential half shaft thereby causing it to rotate at a slower speed, the said power being transferred to the other differential half shaft thereby causing it to rotate at increased speed.

8. The structure of claim 1, each of said epicyclic trains comprising a second gear casing member secured to said secondary change speed shaft, and means for locking said secondary shaft to obtain a reverse speed.

9. The structure of claim 1 further characterized in that said gearing means comprise a train of gears between the differential half-shafts and the corresponding member of the epicyclic train, said train of gears being so arranged that the component of the speed of the output shaft due to the speed of the differential half-shaft is in the opposite direction to that due to the secondary change-speed shaft, each of said epicyclic trains comprising a second gear casing member secured to said secondary change speed shaft, and means for locking said secondary shaft to obtain a reverse speed.

10. The structure of claim 1, each of said epicyclic trains comprising a second gear casing member secured to said secondary change speed shaft, and means for locking said secondary shaft to obtain a forward speed.

11. Steering mechanism according to claim 1 each of said epicyclic trains comprising a second gear casing member secured to said secondary change speed shaft, means for locking said secondary shaft to obtain a reverse speed and wherein said means for inducing a difference of speed between the differential half shafts comprise brakes operative to control the respective speeds of said half shafts.

12. Steering mechanism according to claim 1 and further characterized in that said gearing means comprises a train of gears between the differential half-shafts and the corresponding member of epicyclic train, said train of gears being so arranged that the component of the speed of the output shaft due to the speed of the differential half shaft is in the opposite direction to that due to the secondary change speed shaft, each of said epicyclic trains comprising a second gear casing member secured to said secondary change speed shaft, means for locking said secondary shaft to obtain a reverse speed, and wherein said means for inducing a difference of speed between the differential half shafts comprise brakes operative to control the respective speeds of said half shafts.

13. Steering mechanism according to claim 1, and each of said epicyclic trains comprising a second gear casing member secured to said secondary change speed shaft, means for locking said secondary shaft to obtain a forward speed, and wherein said means for inducing a difference of speed between the differential half shafts comprise brakes operative to control the respective speeds of the said half shafts.

HENRY E. MERRITT.